US012197602B2

(12) United States Patent
Erickson

(10) Patent No.: US 12,197,602 B2
(45) Date of Patent: Jan. 14, 2025

(54) REDUNDANT DATA LOG RETRIEVAL IN MULTI-PROCESSOR DEVICE

(71) Applicant: Rambus Inc., San Jose, CA (US)

(72) Inventor: Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 275 days.

(21) Appl. No.: 17/968,488

(22) Filed: Oct. 18, 2022

(65) Prior Publication Data

US 2023/0161599 A1 May 25, 2023

Related U.S. Application Data

(60) Provisional application No. 63/282,981, filed on Nov. 24, 2021.

(51) Int. Cl.
*G06F 12/14* (2006.01)
*G06F 21/57* (2013.01)
*G06F 21/62* (2013.01)
*G06F 11/07* (2006.01)
*G06F 11/14* (2006.01)

(52) U.S. Cl.
CPC ............ *G06F 21/62* (2013.01); *G06F 21/577* (2013.01); *G06F 11/0778* (2013.01); *G06F 11/1471* (2013.01)

(58) Field of Classification Search
CPC ................................ G06F 21/62; G06F 21/577
USPC ........................................................ 713/189
See application file for complete search history.

(56) References Cited

U.S. PATENT DOCUMENTS

| 8,621,282 | B1* | 12/2013 | Mixter | G06F 11/0706 |
| | | | | 714/38.11 |
| 9,939,074 | B2 | 4/2018 | Svensson | |
| 10,171,470 | B2 | 1/2019 | Burch et al. | |
| 11,105,850 | B2 | 8/2021 | Trantham | |
| 11,360,839 | B1* | 6/2022 | Hsiao | G06F 13/4282 |
| 11,501,202 | B1* | 11/2022 | Stefani | G06F 16/9038 |
| 2017/0371731 | A1* | 12/2017 | Khan | G06F 11/079 |
| 2019/0318079 | A1* | 10/2019 | Sandoval | G06F 21/51 |
| 2020/0117814 | A1 | 4/2020 | Ito et al. | |
| 2020/0356555 | A1* | 11/2020 | Lee | G06F 16/2455 |

(Continued)

OTHER PUBLICATIONS

Author Anonymous, "Design of Multi Core Application Processor Embedded System Based on NXP Semiconductors", Electronic Paper, Dec. 11, 2020, Downloaded on Sep. 20, 2021 at https://ee-paper.com/design-of-multi-core-application-processor-embedded-system-based-on-nxp-semiconductors/. 12 pages.

*Primary Examiner* — Haresh N Patel
(74) *Attorney, Agent, or Firm* — Lowenstein Sandler LLP

(57) ABSTRACT

A device includes interface circuitry to receive requests from at least one host system, a primary processor coupled to the interface circuitry, and a secure processor coupled to the primary processor. In response to a failure of the primary processor, the secure processor is to: verify a log retrieval command received via the interface circuitry, wherein the log retrieval command is cryptographically signed; in response to the verification, retrieve crash dump data stored in memory that is accessible by the primary processor; generate a log file that comprises the retrieved crash dump data; and cause the log file to be transmitted to the at least one host system over a sideband link that is coupled externally to the interface circuitry.

20 Claims, 6 Drawing Sheets

(56) References Cited

U.S. PATENT DOCUMENTS

| | | | |
|---|---|---|---|
| 2022/0261301 A1* | 8/2022 | Philip | G06N 20/20 |
| 2023/0008238 A1* | 1/2023 | Mugunda | G06F 21/606 |
| 2023/0009470 A1* | 1/2023 | Ponnuru | H04L 63/1466 |
| 2023/0010283 A1* | 1/2023 | Ramaiah | G06F 21/44 |

* cited by examiner

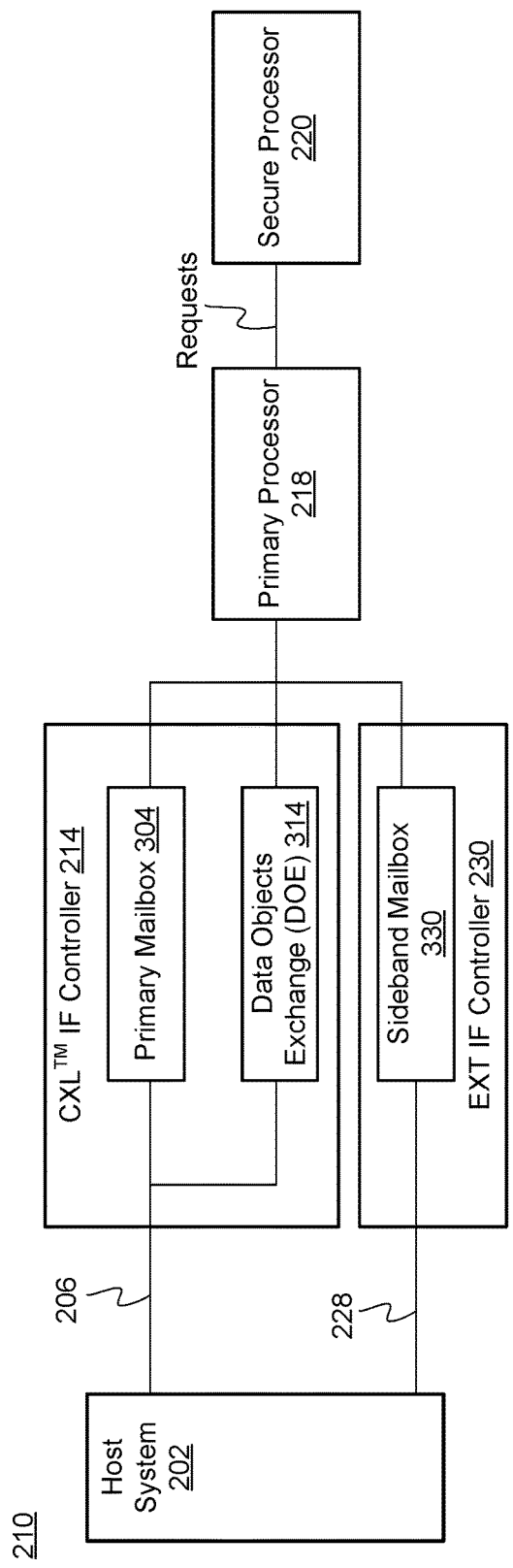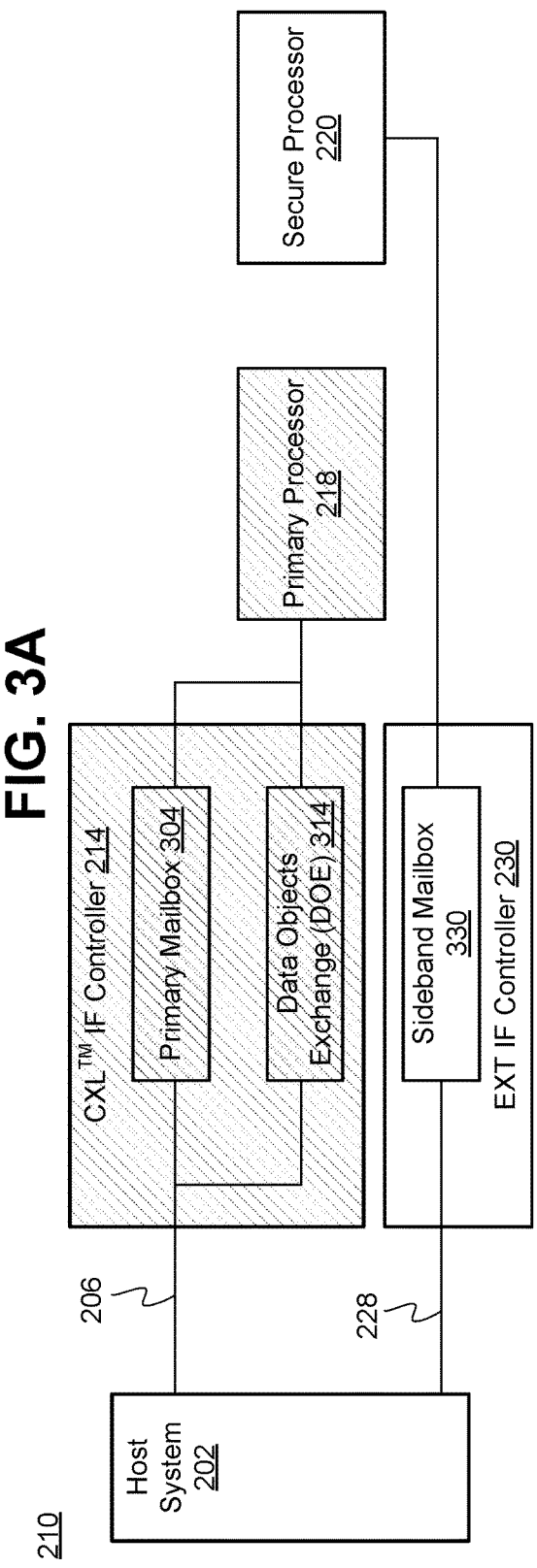
FIG. 3A
FIG. 3B

REDUNDANT DATA LOG RETRIEVAL IN MULTI-PROCESSOR DEVICE

RELATED APPLICATIONS

This application claims the benefit of U.S. Provisional Application No. 63/282,981, filed Nov. 24, 2021, the entire contents of which are incorporated by reference.

TECHNICAL FIELD

The disclosure pertains to multi-processor buffer devices, and more specifically, to redundant data log retrieval in multi-processor devices.

BRIEF DESCRIPTION OF THE DRAWINGS

The present disclosure is illustrated by way of example, and not by way of limitation, in the figures of the accompanying drawings.

FIG. 3A is a block diagram illustrating an interface controller functionality with respect to a Compute Express Link™ (CXL™) interface controller and a sideband external interface controller of the buffer device according to some embodiments.

FIG. 3B is the block diagram of FIG. 3A when the primary processor fails and the secure processor takes over limited functionality according to some embodiments.

DETAILED DESCRIPTION

Figure 1:
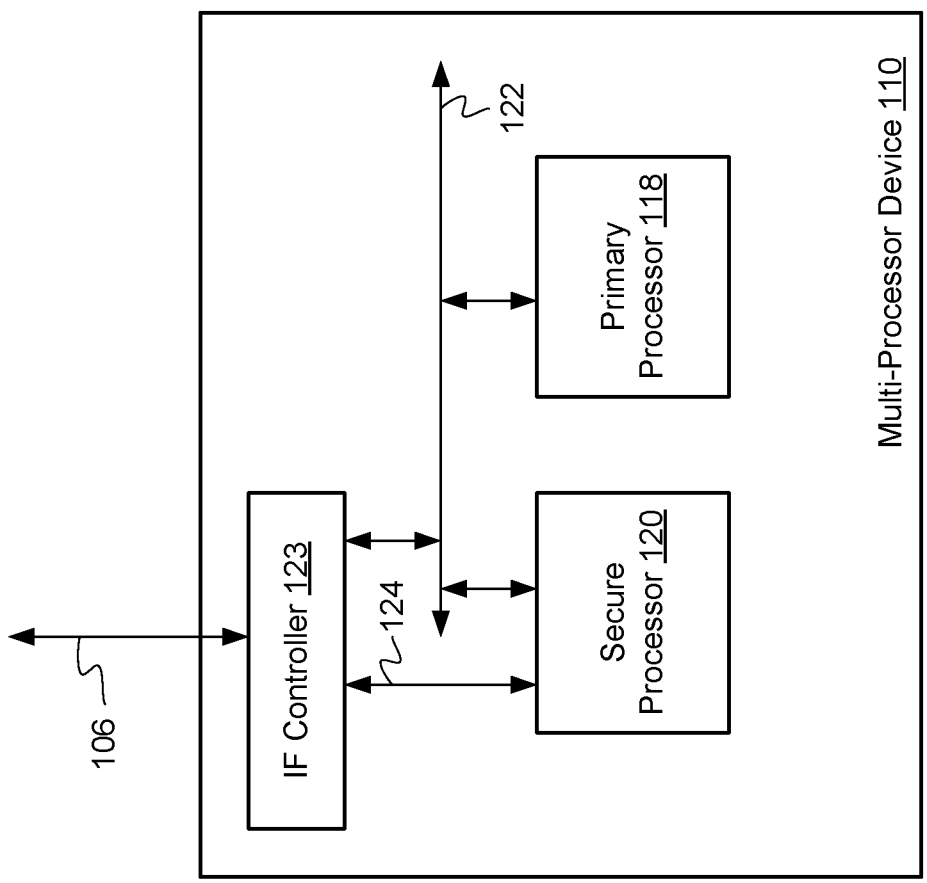
FIG. 1 is a multi-processor device according to some embodiments.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure include redundant data log retrieval in multi-processor devices, particularly when the primary processor fails. Some memory modules employ a buffer device, which may be a system on a chip (SoC) or integrated circuit (IC), for example, to buffer and help handle memory requests from many different sources, herein referred to as hosts or external memory controllers. These memory modules, for example, may be common in data centers where many machines are interconnected even if owned or controlled by different entities. The buffer device may, for example, employ a primary processor together with a secondary or secure processor that supports the primary processor, e.g., to secure boot of the buffer device, perform device attestation, key management, secure firmware updates, and encryption and decryption tasks, among others. As such, the secure processor may be a root of trust (RoT) and specialize in tasks that help secure overall operation of the buffer device while allowing the primary processor to focus its processing on core functions of handling memory requests and the like.

In certain multi-processor buffer devices as just described, the primary processor might fail for various reasons other than power failure, meaning that the buffer device may remain powered but has severely impacted operational capability. In some situations, the secure processor may try to restore the primary processor to resume operation, but such restoration is not guaranteed and may require the help of external troubleshooting. If debugging the primary processor to determine the reason for the failure is not possible, the entire machine may have to be rebooted, causing downtime that is endeavored to be avoided in data centers.

Further, without the primary processor being functional, it is difficult to obtain data logs that have been cached and/or stored in non-volatile memory and that are most relevant to functioning of the primary processor at the time of its failure. These data logs may buffer (or log) trace data generated by program code execution at instruction level. For example, trace data may include, but is not limited to, the contents of one or more cache lines, registers, and the like, within main memory, as well as the contents of the program code that is being executed. These contents can include, for example, device state, command history, register values, stack pointer, program counter, and the like. Without such trace data in the data logs, the program code operation cannot be debugged to determine and address one or more causes of the failure.

Aspects of the present disclosure address the above and other deficiencies by employing a redundant path in multi-processor buffer devices for data log retrieval and export that does not necessarily involve the primary processor. In some embodiments, in response to detecting failure of the primary processor, the secure processor may be re-routed to connect directly to external interface circuitry, e.g., that communicates over a sideband link, so as to provide some limited functionality, including communicating with a host or management system that needs to receive the data logs. Further, the secure processor may be configured to act on a log retrieval command, after the command is cryptographically verified, in order to retrieve crash dump data stored in on-chip memory that is accessible by the primary processor. The most useful crash dump data may be stored in on-chip volatile memory such as static random access memory (SRAM) that may be quickly written to leading up to the time of the failure. The secure processor may also be configured to generate a log file of the crash dump data and cause the log file to be transmitted to the host or management system over the sideband link.

In various embodiments, the secure processor may also be configured to enter a locked-down state of limited operations and heightened security. For example, the secure processor may inactivate the primary processor to avoid unintended operation that might expose sensitive data, and ignore commands sent by an application programming interface (API) of the primary processor that may still be received. Further, the secure processor may retain some secure sessions active and invalidate a device attestation state associated with the buffer device, among other functions that will be discussed.

Benefits that may be realized with certain embodiments of the approaches described herein include, but are not limited to, the ability to retain some level of secure functionality within a buffer device (such as the disclosed multi-processor buffer device) when the primary processor fails and the ability to securely retrieve, and transmit off-chip, one or more crash dump data logs that are associated with that failure. Additional details with respect to redundant data log retrieval in the multi-processor buffer device are provided below with respect to FIGS. 1-6.

FIG. 1 is a multi-processor device 110 according to some embodiments. As illustrated, the multi-processor device 110 includes interface circuitry, such as an interface controller 123, to receive messages from a requestor over a communications link 106. The multi-processor device 110 further includes a primary processor 118 coupled to the interface controller 123 to process requests in the received messages, and a secondary processor, e.g., a secure processor 120, is coupled to the interface controller 123 to perform cryptographic functions on behalf of the primary processor 118. The interface controller 123, the primary processor 118, and the secure processor 120 may be coupled together via a bus 122.

In various embodiments, the primary processor 118 is responsible for overall control of the multi-processor device 110, while the secure processor 120 operates on behalf of the primary processor 118. In one embodiment, the secure processor 120 takes the form of a secure processor, such as a hardware root of trust (RoT), to carry out cryptographic operations on behalf of the primary processor 118. Acting on behalf of the primary processor 118, the secure processor 120 may decrypt incoming requests, encrypt outgoing responses from the primary processor 118, perform attestation operations and other cryptographically-related tasks as the need arises. In some embodiments, the secure processor 120 is responsible for a secure boot process for the multi-processor device 110.

In one embodiment, the primary processor 118 and the secure processor 120 take the form of processor cores disposed on a single integrated circuit (IC) die, or chip, forming a system-on-chip (SoC). In such an embodiment, the bus 122 may form one or more of an advanced extensible interface (AXI) for high-speed communications on-chip between the primary processor 118 and the secure processor 120, and/or an advanced peripheral bus (APB) for low-speed control signals transferred on-chip between the processors. Other embodiments may employ separate processor chips disposed on a common substrate to form a chiplet, multi-chip module (MCM) or system-in-package (SIP). Yet other embodiments may employ an interconnected system of multiple packaged processors disposed on separate substrates.

In at least some embodiments, the primary processor 118 generally controls all transfers of requests, data, and/or messages dispatched between the multi-processor device 110 and the requestor (e.g., a host system) via the communications link 106. The requests may take the form of commands and/or interrupts alerting the primary processor 118 to actions that are to be taken. For one embodiment, the communications link 106 at least partially takes the form of a serial management bus (SMBus), inter-integrated circuit (I2C), improved inter-integrated circuit (I3C), or similar chip communications link. In certain embodiments, as explained below, the communications link 106 may also include a high-bandwidth Compute Express Link (CXL™) interface.

In one embodiment, a message is received from a requestor by the interface controller 123 over the communications link 106. In one embodiment, at least a portion of the message is encrypted, such as included in a Security Protocol and Data Model (SPDM) message and/or using Management Component Transport Protocol (MCTP) encapsulation. The primary processor 118 may extract the encrypted portion of the message if necessary, and provide a request to the secure processor 120 (e.g., using an internal application programming interface (API) call) to decrypt the encrypted portion of the message. In response to the request, the secure processor 120 may decrypt the portion of the message that is encrypted on behalf of the primary processor 118, e.g., using an SPDM session key.

Further, according to at least some embodiments, in response to a failure of the primary processor, the secure processor 120 may take over handling of some functions in order to keep the device 110 operational and try to restore operation to the primary processor 118. In these embodiments, the secure processor 120 may verify a log retrieval command received via the interface controller 123 (e.g., that includes interface circuitry), where the log retrieval command is cryptographically signed (see FIG. 5). In response to the verification, the secure processor 120 may retrieve crash dump data stored in memory that is accessible by the primary processor 118 (see FIG. 2). The secure processor 120 may further generate a log file that includes the retrieved crash dump data and cause the log file to be transmitted to the host system over a sideband link that is coupled externally to the interface controller 123, e.g., as a separate portion of the communications link 106.

Figure 2:
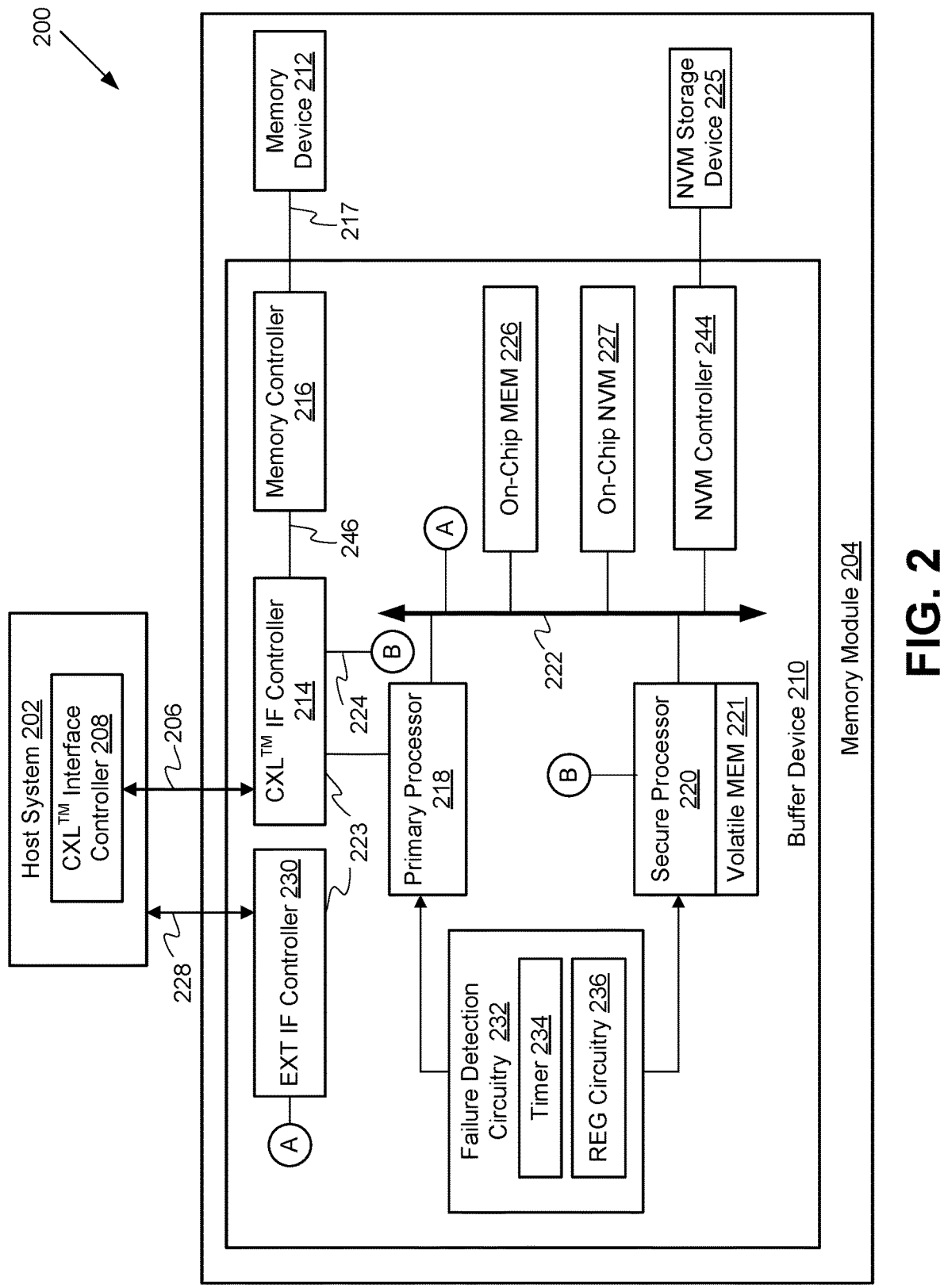
FIG. 2 is a block diagram illustrating a memory system employing a buffer device that implements redundant data log retrieval according to at least one embodiment.

FIG. 2 is a block diagram illustrating a memory system 200 employing a buffer device 210 that implements redundant data log retrieval according to at least one embodiment. In some embodiments, the buffer device 210 is the multi-processor device 100 of FIG. 1, with corresponding components being similarly numbered across embodiments. In various embodiments, the memory system 200 includes a memory module 204 communicatively coupled to at least one host system 202, which may be or include a memory controller for controlling data programmed to and data read from a memory device 212 of the memory module 204.

In at least some embodiments, the memory module 204 includes the memory device 212, a non-volatile (NVM) storage device 225, and the buffer device 210 coupled between the host system 202 and the memory device 212. The buffer device 210 may be, for example, a CXL™ buffer device such as a CXL™ Type 3 memory device capable of sharing memory across multiple hosts and/or controllers, e.g., a non-volatile memory (NVM) Express (NVMe®) device and a graphics processor unit (GPU), as just one example. Compute Express Link™ is an open standard for high-speed central processing unit (CPU)-to-device and CPU-to-memory connections, designed generally for high-performance data center computers, although may be employed elsewhere. Compute Express Link™ is built on the Peripheral Component Interconnect Express (PCIe®) physical and electrical interface with protocols in threes areas, including input/output (I/O), memory, and cache coherence. Thus, the host system 202 may correspondingly include a CXL™ interface controller 208 that operates with the CXL™ standard protocols to communicate with the buffer device 210. While the CXL™ standard is generally referred to herein, it should be understood that another high-speed communication protocol may be employed in lieu of the CXL™ standard.

In these embodiments, the buffer device 210 may include, but not be limited to, a memory controller 216 to execute operations with respect to the memory device 212, a primary processor 218 coupled to a secure processor 220 over a bus 222, volatile memory 221 exclusively accessible by the secure processor 220, and interface circuitry 223 that includes a CXL™ interface controller 214 and a sideband external interface controller 230. The processors may further interface with, over the bus 222, on-chip memory 226, on-chip non-volatile memory (NVM) 227, a NVM controller 244. The buffer device 210 may further include failure detection circuitry 232 coupled between the primary processor 218 and the secure processor 220 and will be discussed in more detail.

In some embodiments, the on-chip memory 226 is volatile memory such as SRAM that is accessible by both the primary processor 218 and the secure processor 220. In some embodiments, the NVM controller 244 interfaces with the NVM storage device 225, such as electrically erasable programmable read-only memory (EEPROM) or other programmable NVM, to control the storage of firmware components used in booting up the buffer device 210, and/or for retrieving updated firmware for performing restore operations on the primary processor 218. The on-chip memory 226 may also employed on the buffer device 210 for use by the primary processor 218 during normal operation. In some operating modes, the on-chip memory 226 is also accessible by the secure processor 220 via the bus 222.

In some embodiments, the CXL™ interface controller 208 is configured to communicate over a CXL™ link 206 utilizing protocols consistent with the CXL™ standards, such as CXL.io and CXL.mem. For some embodiments that involve CXL™ Type 2 devices, an additional CXL.cache protocol may also be utilized. In these embodiments, the memory module 204 is configured to generally support the distributed CXL™ memory architecture, thus allowing one or more host systems to access the memory device 212 via the buffer device, where the memory device may be system memory such as volatile memory devices (e.g., Dynamic Random Access Memory (DRAM) devices) or non-volatile memory devices. In some embodiments, the buffer device 210 takes the form of a system-on-chip (SOC) and includes any of the features described above with respect to the multi-processor device 110 (FIG. 1).

Referring again to FIG. 2, in one embodiment, the buffer device 210 employs a primary interface that includes the CXL™ interface controller 214, which is an in-band controller, and the memory controller 216. The CXL™ interface controller 214 and the memory controller 216 cooperate to provide a transfer path between the in-band CXL link 206 and the memory device 212. In one embodiment, the CXL™ interface controller 214 and the memory controller 216 are directly coupled via a bus 246. In one embodiment, the memory controller 216 includes a double data rate (DDR) memory controller to manage DRAM of the memory device 212 via a secondary interface 217. The primary processor 218 may be configured to solely control the memory controller 216 during normal operation. In accordance with CXL™ standards, the primary processor 218 controls the CXL™ interface controller 214, yet is prevented from directly accessing the memory device 212 in most circumstances to enhance security.

In various embodiments, acting on behalf of the primary processor 218, the secure processor 220 is coupled to the primary processor 218 via an internal system bus 222. As explained above with respect to the multi-processor device 110 of FIG. 1, the secure processor 220 may take the form of a root of trust to carry out cryptographic operations on behalf of the primary processor 218. For one CXL-related embodiment, the secure processor 220 is responsible for encryption/decryption in hardware, as necessary, and may include storage to store cryptographic keys securely. The secure processor 220 may also participate in device attestation operations, confirming that a given device is what the device says it is, through certificate verification and/or other identity confirmation techniques. For some embodiments, the secure processor 220 may exclusively control the secure boot flow for the buffer device 210.

In one embodiment, communications between the host system 202 and the memory module 204 are enhanced through the use of a sideband channel or link 228 that is independent of the CXL™ link 206. To support use of the sideband channel, the buffer device 210 employs additional external interface circuitry in the form of the sideband external interface controller 230, which may support link protocols such as SMBus, I2C and/or I3C. Use of the sideband link 228 provides an auxiliary channel for the buffer device 210 to communicate with the host system 202 (or an external management system of some kind) in the event of a failure event associated with the CXL™ link 206 or to otherwise preserve the bandwidth of the CXL™ link 206. For example, the host system 202 may communicate with the buffer device 210 without interfering with CXL-related signal transfers on the CXL™ link 206.

In one embodiment, a message is received at the memory module 204 from the host system 202. Depending on the embodiment, the message may be received at CXL™ interface controller 214 over the CXL™ link 206, or at the sideband external interface controller 230 over the sideband link 228. In either embodiment, at least a portion of the message may be encrypted, such as included in a secured SPDM message and/or using MCTP encapsulation. The primary processor 218 may extract the encrypted portion of the message if necessary, and provide a request to the secure processor 220 (e.g., using an internal API call) to decrypt the encrypted portion of the message. In response to the request, the secure processor 220 may decrypt the portion of the message that is encrypted on behalf of the primary processor 218 (e.g., using an SPDM session key).

In various embodiments, the memory system 200 generally operates to allow secure accesses to the memory device 212 by the host system 202. Central to system operation is the buffer device 210 operation, which has overall control of memory device accesses and the responsibility of securing corresponding memory transactions. As a more specific form of the multi-processor device 110, the buffer device 210 generally operates in much the same way as described above with slight variations to account for specific CXL™ protocols and associated circuitry.

With continued reference to FIG. 2, the failure detection circuitry 232 generally monitors operation of the primary processor 218. Thus, for some embodiments, the monitoring involves feeding information regarding received requests, such as interrupt signals from the CXL interface controller 214 and/or the sideband external interface controller 230, to the failure detection circuitry 232. In at least one embodiment, as the failure detection circuitry 232 receives the interrupt signals, the failure detection circuitry 232 tracks status information such as timeout indications generated by a timer circuit 234 that monitors incoming interrupts and expected execution latencies associated with the action corresponding to the asserted interrupt.

With reference to the failure detection circuitry 232, other embodiments employ register circuitry 236, such as a heartbeat status register that may be periodically updated by the primary processor 218 to indicate activity taken by the primary processor 218, and conversely to indicate unexpected inactivity on the part of the primary processor 218. Although FIG. 2 illustrates a separate circuit block for the failure detection circuitry 232, in some embodiments, the failure detection circuitry 232 is included in whole or in part in the circuitry of the secondary processor 220 to perform one or more of the failure detection functions described above.

In various embodiments, in response to detecting a failure event associated with the primary processor 218, the failure detection circuitry 232 (or the secure processor 220) initiates a failure mode operation. The failure event can be detected, for example, by either the timer circuit 234 reaching a predetermined threshold count and/or the register circuitry 236 being triggered by unexpected activity or inactivity. The remainder of the disclosure primarily discusses actions to be taken by the buffer device 210 in response to such a failure of the primary processor 218.

In at least one embodiment, in response to detecting the failure event, the secure processor 220 is configured to bypass communication with the primary processor 218 and directly communicate with the sideband external interface controller 230 via the bus 222, e.g., to interface with the host system 202. Further, the secure processor 220 can still receive messages, including commands, via the CXL™ interface controller 214 by the secure private bus 224 that may still remain active.

In these embodiments, in response to detecting the failure of the primary processor 218, the secure processor 220 can further verify a log retrieval command received via the interface circuitry of the interface controller 223, e.g., either from the sideband external interface controller 230 or from the CXL™ interface controller 214. The log retrieval command is cryptographically signed and may be verified as will be discussed with reference to FIG. 5. In response to the verification, the secure processor 220 is further configured to retrieve crash dump data stored in memory that is accessible by the primary processor 218. This memory can include, for example, the on-chip memory 226, the on-chip NVM 227, the NVM storage device 225, or a combination thereof. The secure processor 220 can further generate a log file that includes the retrieved crash dump data and cause the log file to be transmitted to the host system 202 over the sideband link 228 that is coupled externally to the interface circuitry, for example.

FIG. 3A is a block diagram illustrating an interface controller functionality with respect to the CXL™ interface controller 214 and the sideband external interface controller 230 of the buffer device 210 according to some embodiments. In at least some embodiments, the CXL™ interface controller 214 includes, among other sub-components, a primary mailbox 304 and a data object exchange (DOE) interface 314. The majority of the message and commands may be received via the primary mailbox 304 during normal operation while the DOE interface 314 supports additional data object transport protocols. Further, in these embodiments, the sideband external interface controller 230 further includes a sideband mailbox 330 through which to receive auxiliary message and commands, which may not be specific to any protocol such as the CXL™ standard of protocols.

FIG. 3B is the block diagram of FIG. 3A when the primary processor 218 fails and the secure processor 220 takes over limited functionality according to some embodiments. When the secure processor 220 detects a failure event, e.g., as was discussed may occur through the failure detection circuitry 232 of FIG. 2, the secure processor 220 can enter a failure mode of operation. In the failure mode, the secure processor 220 can be rerouted to bypass the primary processor 218. In this way, the secure processor 220 can communicate directly with the sideband mailbox 330 of the sideband external interface controller 230 of the interface circuitry 223. Further, any CXL™ commands sent via the primary mailbox 304 and/or the DOE 314 are not received. Full SPDM command set and MCTP encapsulation may not be supported over the sideband external interface controller 230.

Further, during the failure operation mode, according to various embodiments, the secure processor 220 is configured to enter a locked-down state of limited operation and inactivate the primary processor 218 to avoid unintended operation of the primary processor 218. Further, the secure processor 220 may ignore commands sent by an application programming interface of the primary processor 218, e.g., to not inadvertently provide sensitive data to an attacker that has caused the primary processor 218 to fail.

In at least some embodiments, during the failure mode of operation, the secure processor 220 may further retain as active one or more SPDM sessions, e.g., over the sideband external interface controller 230. All standard SPDM requests may be responded to with an error. The secure processor 220 may further invalidate a device attestation state associated with the buffer device 210, thus causing any trusted relationship with the host 202 or other external controller to terminate. The secure processor 220 may further accept command messages conforming to one of a custom message protocol or that are SPDM vendor-defined messages, to limit operation of the buffer device 210 during the failure mode. The custom message protocol may be a minimally functioning protocol supporting limited command messages, e.g., that may provide some proprietary limited level of operation.

In at least on extended embodiment, the secure processor 220 is further configured to retrieve second crash dump data stored in the volatile memory 221 that is accessible only by the secure processor, where the second crash dump data has been generated by the secure processor 220. The secure processor 220 can then combine the crash dump data with the second crash dump data into the log file, enabling a larger amount of crash dump data to be analyzed in debugging a reason for the failure of the primary processor 218.

Figure 4:
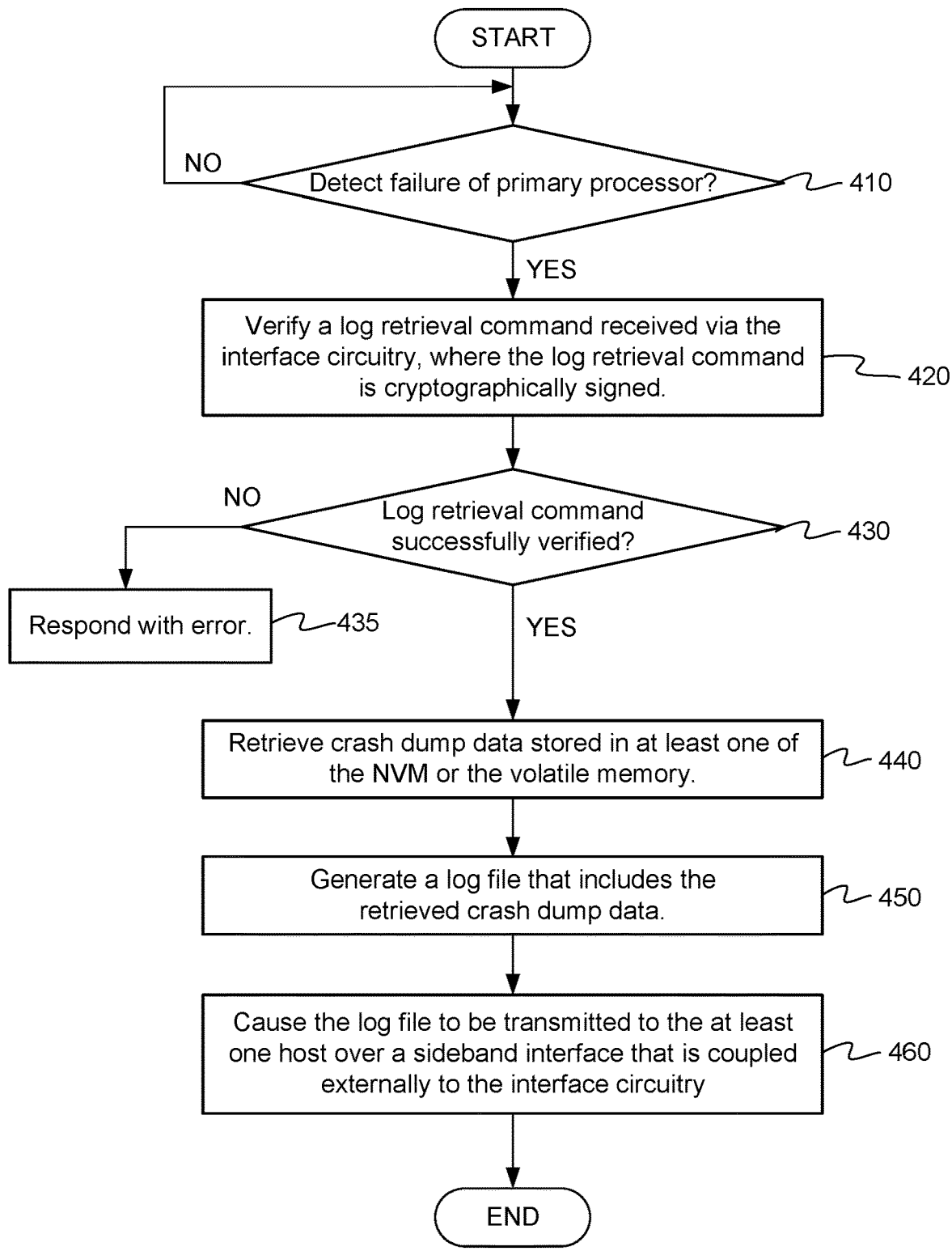
FIG. 4 is a flow diagram of a method for a secure processor performing data log retrieval in response to failure of the primary processor according to at least some embodiments.

FIG. 4 is a flow diagram of a method 400 for a secure processor performing data log retrieval in response to failure of the primary processor according to at least some embodiments. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by the secure processor 120 and/or 220, as illustrated in FIGS. 1-2. In another embodiment, the method 400 is performed by the failure detection circuitry 232 in combination with the secure processor 120 and/or 220.

At operation 410, the processing logic determines whether a failure of the primary processor 218 has occurred.

The processing logic of the secure processor 220 may determine or be notified (e.g., via the failure detection circuitry) of a failure event.

At operation 420, the processing logic verifies a log retrieval command received via the interface circuitry 223, where the log retrieval command is cryptographically signed. Operation 420 will be discussed in more detail with reference to FIG. 5.

At operation 430, the processing logic determines whether the log retrieval command was successfully verified. If not, at operation 435, the processing logic responds with an error, e.g., to alert an operator that the command is not secure and will not be able to proceed with putting together the log file of crash dump data.

At operation 440, in response to an affirmative response to the inquiry of operation 430, the processing logic retrieves crash dump data stored in memory that is accessible by the primary processor. The memory may be accessible by both the primary processor 218 and the secure processor 220 and include at least one of non-volatile memory or a volatile memory.

At operation 450, the processing logic generates a log file that includes the retrieved crash dump data. At operation 460, the processing logic causes the log file to be transmitted to at least one host system over the sideband link 228 that is coupled externally to sideband external interface controller 230 of the interface circuitry 223.

Figure 5:
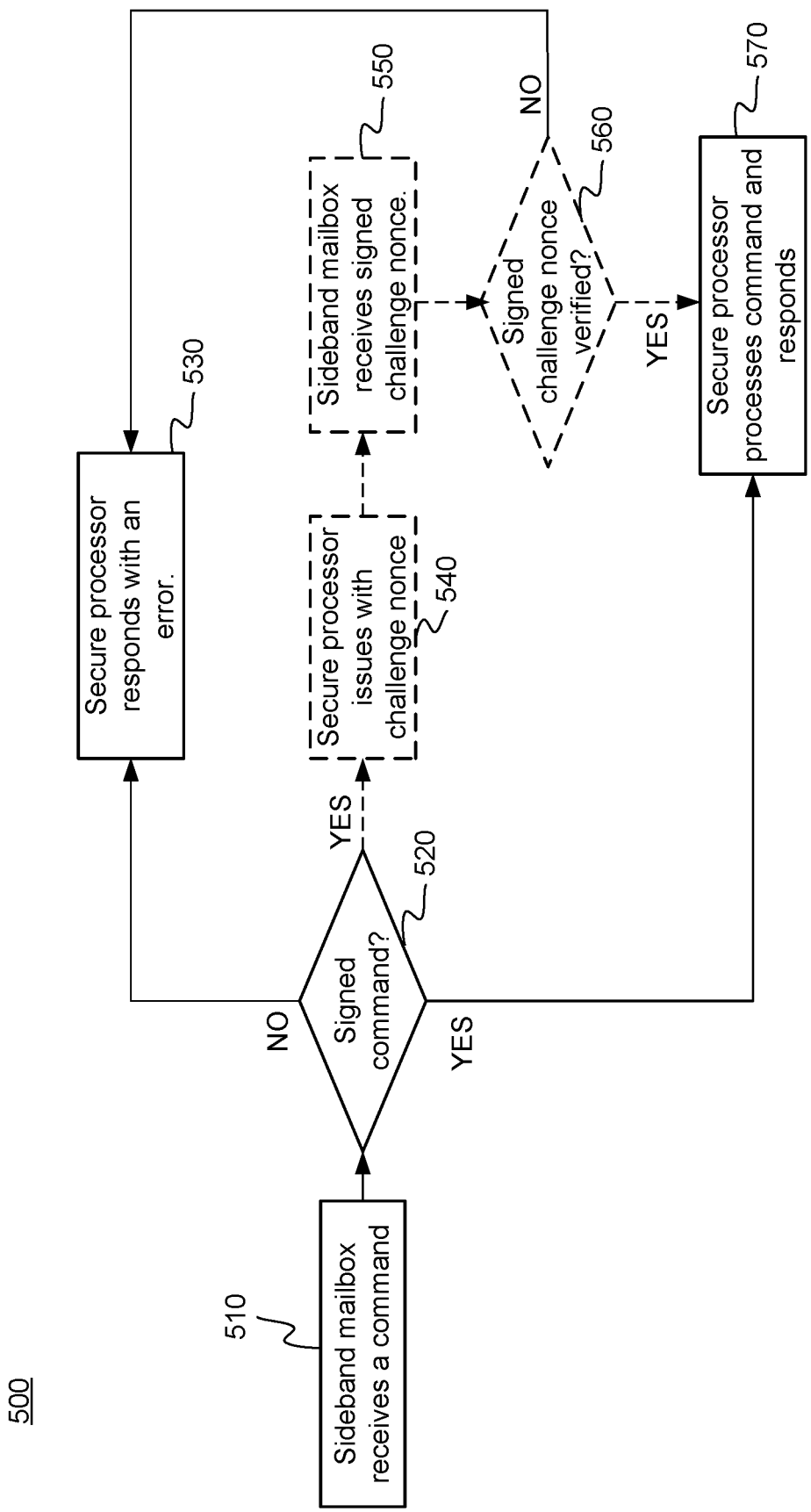
FIG. 5 is a flow diagram of a method for the secure processor verifying a log retrieval command and an optional challenge nonce verification according to some embodiments.

FIG. 5 is a flow diagram of a method 500 for the secure processor 220 verifying a log retrieval command and an optional challenge nonce verification according to some embodiments. Incoming message commands are to be signed with a private key for which a public key was pre-provisioned to the secure processor 220. Ideally, these private and public keys are limited to enabling (or useable for) device recovery and/or debug operations. The public key may be stored in one-time programmable (OTP) memory that is accessible only to the secure processor. In some embodiments, the OTP memory exists at the on-chip NVM 227 or the NVM storage device 225.

In some embodiments, the host 202 uses the corresponding private key to send a command, which the data center or vendor can make available to the secure processor 220 with some proprietary approach that is beyond the scope of this disclosure. In at least some embodiments, the secure processor 220 is configured to facilitate some secure operations like opening up the JTAGs (e.g., of Joint Test Action Group standard) so as to enable debugging to determine what caused the primary processor 220 to fail. These need to be made available securely so the memory module 204 is not opened up wide and expose sensitive data to external actors, including the host 202.

With reference to FIG. 5, at operation 510, the secure processor 220 receives the log retrieval command, which is cryptographically signed. At operation 520, the secure processor 220 determines whether the log retrieval command is cryptographically signed. For example, the secure processor 220 can cryptographically process, using the private key that was pre-provisioned for the secure processor 220, a cryptographic signature of the log retrieval command and confirm the cryptographic signature was created using the private key.

If the secure processor 220 has not successfully verified the cryptographic signature of the signed log retrieval command, at operation 530, the secure processor 220 responds with an error. Alternatively, if the secure processor 220 has successfully verified the cryptographic signature, at operation 570, the secure processor 220 processes the log retrieval command and responds with the log file as per operations 440-460 of FIG. 4, for example.

In at least some embodiments, in response to the cryptographic signature being successfully verified, at operation 540, the secure processor 220 further optionally issues a challenge. At operation 550, the secure processor 220 receives a signed challenge nonce in response to the challenge nonce.

At operation 560, the secure processor 220 verifies whether the signed challenge nonce was signed with the private key to prevent a replay attack. If the signed challenge nonce is not successfully verified, at operation 530, the secure processor responds with an error. Alternatively, if the signed challenge nonce is successfully verified, at operation 570, the secure processor 220 processes the log retrieval command and responds with the log file as per operations 440-460 of FIG. 4, for example.

Figure 6:
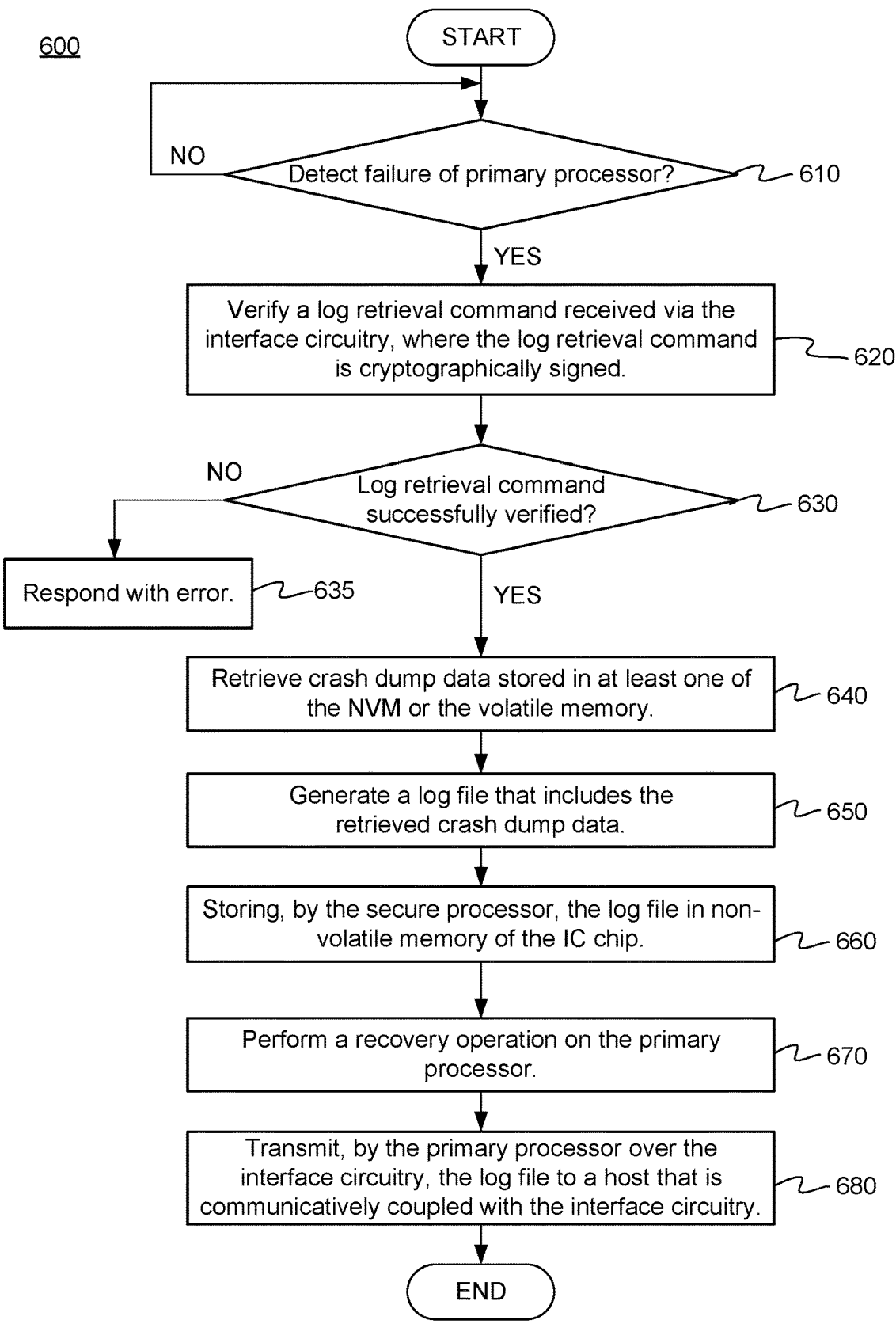
FIG. 6 is a flow diagram of a method for the secure processor performing data log retrieval and primary processor recovery in response to failure of the primary processor according to some embodiments.

FIG. 6 is a flow diagram of a method 600 for the secure processor performing data log retrieval and primary processor recovery in response to failure of the primary processor according to some embodiments. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by the secure processor 120 and/or 220, as illustrated in FIGS. 1-2. In another embodiment, the method 600 is performed by the failure detection circuitry 232 in combination with the secure processor 120 and/or 220 and the primary processor 118 and/or 218.

At operation 610, the processing logic determines whether a failure of the primary processor 218 has occurred. The processing logic of the secure processor 220 may determine or be notified (e.g., via the failure detection circuitry) of a failure event.

At operation 620, the processing logic verifies a log retrieval command received via the interface circuitry 223, where the log retrieval command is cryptographically signed (see FIG. 5).

At operation 630, the processing logic determines whether the log retrieval command was successfully verified. If not, at operation 635, the processing logic responds with an error, e.g., to alert an operator that the command is not secure and will not be able to proceed with putting together the log file of crash dump data.

At operation 640, in response to an affirmative response to the inquiry of operation 630, the processing logic retrieves crash dump data stored in memory that is accessible by the primary processor. The memory may be accessible by both the primary processor 218 and the secure processor 220 and include at least one of non-volatile memory or a volatile memory.

At operation 650, the processing logic generates a log file that includes the retrieved crash dump data.

At operation 660, the processing logic stores the log file in non-volatile memory of the IC chip, e.g., of the buffer device 210.

At operation 670, the processing logic performs (or triggers) a recovery operation on the primary processor 218 to restore operation to the primary processor 218.

At operation 680, the primary processor 218 transmits, over the interface circuitry, the log file to the host system 202 that is communicatively coupled with the interface circuitry. This function by the primary processor 218 may occur without the need to reboot the primary processor 218 when the secure processor 220 is able to successfully restore the primary processor 218 to an operative state. In some embodiments, the primary processor 218 restores attestation state(s) and other cryptographic verification with the host system 202 before transmitting the log file.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:

1. A device comprising:
   interface circuitry to receive requests from at least one host system;
   a primary processor coupled to the interface circuitry; and
   a secure processor coupled to the primary processor, wherein, in response to a failure of the primary processor, the secure processor is to:
      verify a log retrieval command received via the interface circuitry, wherein the log retrieval command is cryptographically signed;
      in response to the verification, retrieve crash dump data stored in memory that is accessible by the primary processor;
      generate a log file that comprises the retrieved crash dump data; and
      cause transmission of the log file transmitted to the at least one host system over a sideband link that is coupled externally to the interface circuitry.

2. The device of claim 1, wherein the secure processor is further to:
   detect the failure of the primary processor; and
   bypass communication with the primary processor by directly communicating with a sideband mailbox of the interface circuitry to receive the requests.

3. The device of claim 1, further comprising the memory, wherein the memory is accessible by both the primary processor and the secure processor and comprises at least one of non-volatile memory or a volatile memory.

4. The device of claim 1, wherein the secure processor is further to:
   enter a locked-down state of limited operation;
   inactivate the primary processor to avoid unintended operation of the primary processor; and
   ignore commands sent by an application programming interface of the primary processor.

5. The device of claim 4, wherein, in the locked-down state, the secure processor is further to at least one of:

retain as active one or more secured security protocol and data model (SPDM) sessions;
invalidate a device attestation state associated with the device; and
accept command messages conforming to one of a custom message protocol or that are SPDM vendor-defined messages.

6. The device of claim 1, wherein the log retrieval command is received over the sideband link, and to verify the log retrieval command, the secure processor is to:
cryptographically process, using a private key that was pre-provisioned for the secure processor, a cryptographic signature of the log retrieval command; and
confirm the cryptographic signature was created using the private key.

7. The device of claim 6, wherein the private key is made accessible to the secure processor over the interface circuitry and is only useable for device recovery and debug, and wherein the secure processor is further to store the private key in one-time programmable (OTP) memory accessible only by the secure processor.

8. The device of claim 6, wherein the secure processor is further to:
issue a challenge nonce in response to verifying the log retrieval command;
receive a signed challenge nonce in response to the challenge nonce; and
verify the signed challenge nonce was signed with the private key to prevent a replay attack.

9. The device of claim 1, further comprising a volatile memory that is accessible only by the secure processor, and the secure processor is further to:
retrieve second crash dump data stored in the volatile memory, the second crash dump data having been generated by the secure processor; and
combine the crash dump data with the second crash dump data into the log file.

10. An integrated circuit (IC) chip comprising:
a non-volatile memory (NVM);
a volatile memory;
interface circuitry to receive requests from at least one host system;
a primary processor coupled to the interface circuitry, the NVM, and the volatile memory; and
a secure processor coupled to the primary processor, the NVM, and the volatile memory, wherein the secure processor is to, in response to a failure of the primary processor:
verify a log retrieval command received via the interface circuitry, wherein the log retrieval command is cryptographically signed;
in response to the verification, retrieve crash dump data stored in at least one of the NVM or the volatile memory;
generate a log file that comprises the retrieved crash dump data; and
cause transmission of the log file transmitted to the at least one host system over a sideband link that is coupled externally to the interface circuitry.

11. The IC chip of claim 10, wherein the secure processor is further to:
detect the failure of the primary processor; and
bypass communication with the primary processor by directly communicating with a sideband mailbox of the interface circuitry to receive the requests.

12. The IC chip of claim 10, wherein the secure processor is further to:
enter a locked-down state of limited operation;
inactivate the primary processor to avoid unintended operation of the primary processor; and
ignore commands sent by an application programming interface of the primary processor.

13. The IC chip of claim 12, wherein, in the locked-down state, the secure processor is further to at least one of:
retain as active one or more secured security protocol and data model (SPDM) sessions;
invalidate a device attestation state associated with the device; and
accept command messages conforming to one of a custom message protocol or that are SPDM vendor-defined messages.

14. The IC chip of claim 10, wherein the log retrieval command is received over the sideband link, and to verify the log retrieval command, the secure processor is to:
cryptographically process, using a private key that was pre-provisioned for the secure processor, a cryptographic signature of the log retrieval command; and
confirm the cryptographic signature was created using the private key.

15. The IC chip of claim 14, wherein the private key is made accessible to the secure processor over the interface circuitry and is only useable for device recovery and debug, and wherein the secure processor is further to store the private key in one-time programmable (OTP) memory accessible only by the secure processor.

16. The IC chip of claim 14, wherein the secure processor is further to:
issue a challenge nonce in response to verifying the log retrieval command;
receive a signed challenge nonce in response to the challenge nonce; and
verify the signed challenge nonce was signed with the private key to prevent a replay attack.

17. The IC chip of claim 10, further comprising a second volatile memory that is accessible only by the secure processor, and the secure processor is further to:
retrieve second crash dump data stored in the second volatile memory, the second crash dump data having been generated by the secure processor; and
combine the crash dump data with the second crash dump data into the log file.

18. A method of operating an integrated circuit (IC) chip comprising interface circuitry, a primary processor coupled to the interface circuitry, and a secure processor coupled to the primary processor, wherein the method of operating the IC chip comprises, in response to a failure of the primary processor:
verifying, by the secure processor, a log retrieval command received via the interface circuitry, wherein the log retrieval command is cryptographically signed;
in response to the verifying, retrieving, by the secure processor, crash dump data stored in memory that is accessible by the primary processor;
generating, by the secure processor, a log file that comprises the retrieved crash dump data;
storing, by the secure processor, the log file in non-volatile memory of the IC chip;
performing a recovery operation on the primary processor to restore operation to the primary processor; and
transmitting, by the primary processor over the interface circuitry, the log file to a host system that is communicatively coupled with the interface circuitry.

19. The method of claim 18, further comprising:

detecting, by the secure processor, the failure of the primary processor; and bypassing, by the secure processor, communication with the primary processor by directly communicating with a sideband mailbox of the interface circuitry that is coupled with a sideband link.

20. The method of claim 18, further comprising receiving, by the secure processor, the log retrieval command over a sideband link coupled to the interface circuitry, and wherein verifying the log retrieval command comprises:

cryptographically processing, using a private key that was pre-provisioned for the secure processor, a cryptographic signature of the log retrieval command; and confirming the cryptographic signature was created using the private key.

* * * * *